July 11, 1933.  A. C. MABEE  1,917,656
LOCK STRUCTURE
Filed March 7, 1932
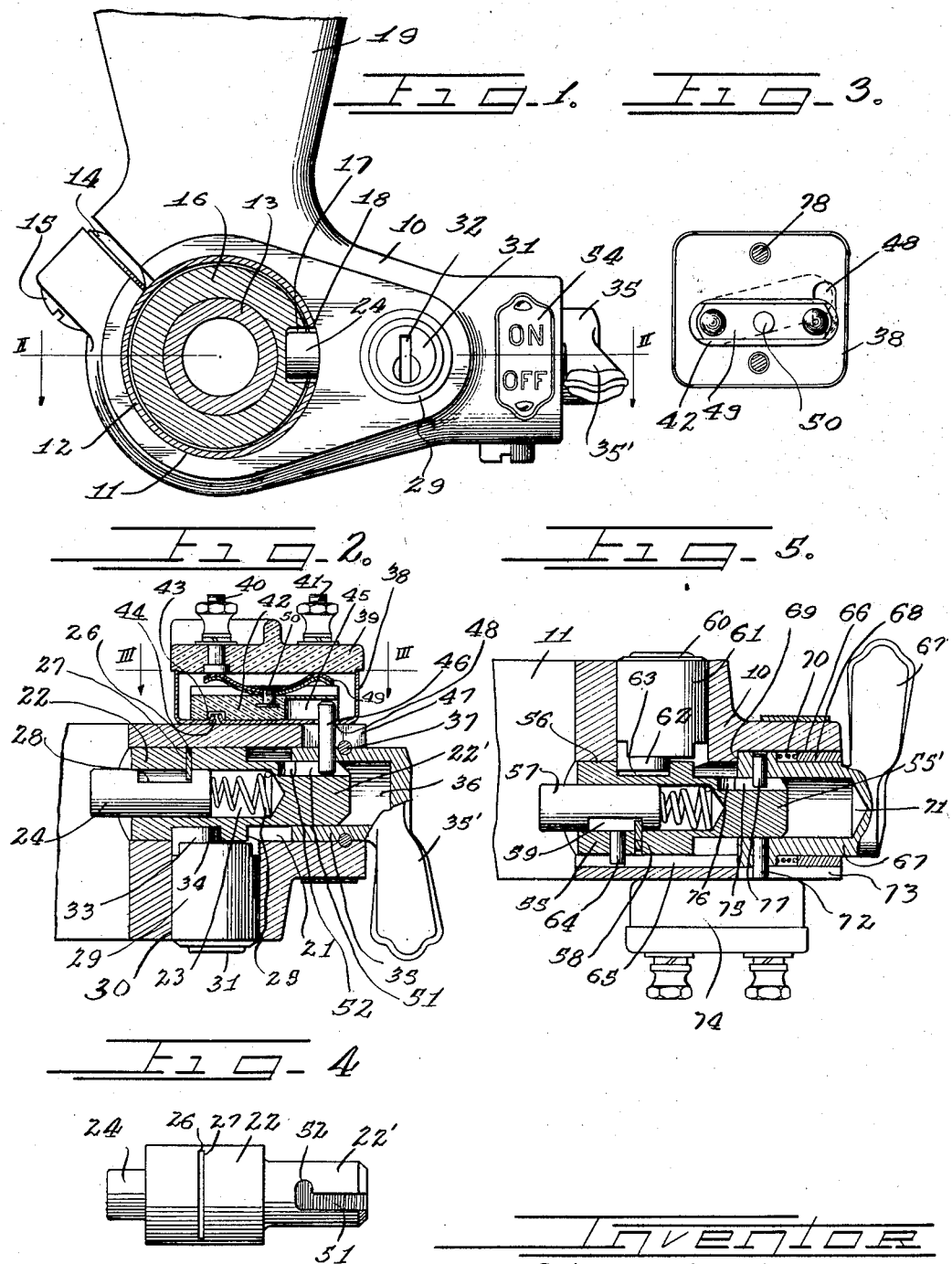
Inventor
Alexander C. Mabee.

Patented July 11, 1933

1,917,656

UNITED STATES PATENT OFFICE

ALEXANDER C. MABEE, OF VILLA PARK, ILLINOIS, ASSIGNOR TO OAKES PRODUCTS CORPORATION, OF NORTH CHICAGO, ILLINOIS, A CORPORATION OF MICHIGAN

LOCK STRUCTURE

Application filed March 7, 1932. Serial No. 597,215.

My invention relates to improved lock structure for locking or releasing certain control elements as for example the steering control and the ignition control in automotive vehicles.

The invention concerns particularly that type of lock mechanism in which a locking bolt is provided for locking and unlocking the steering control, and a lever structure is adapted by its rotation to cause operation of a switch for controlling the ignition circuit, together with interlocking means for preventing movement of the lever when the lock bolt is in steering locking position and to prevent movement of the locking bolt to locking position when the lever is in a certain switch controlling position.

An important object of the invention is to provide construction and arrangement in which the locking bolt is capable of only longitudinal movement in axial direction and in which the lever structure has direct connection with the switch mechanism and is rotatable for operation of the switch mechanism independently of rotational movement of the locking bolt.

A further object is to provide construction and arrangement in which the locking bolt is shiftable axially independently of the switch controlling lever structure and the lever structure is operable for control of the switch independently of rotational movement of the locking bolt.

Another object is to provide construction and arrangement in which the locking bolt is capable only of longitudinal or axial movement and the lever structure is capable only of rotational movement and with the switch controlled by the rotational movement of said lever structure.

Another object is to provide an arrangement in which the locking bolt and the lever structure are coaxially mounted in the lock housing, with the bolt prevented from rotational movement and with the lever structure rotatable only when the lock bolt is in unlocking position.

A still further object is to provide an arrangement in which the locking bolt and lever structure are coaxially mounted in the lock housing, with the locking bolt held against rotational movement, together with means controlled by the axial shift of said locking bolt for locking or unlocking said lever structure.

The above specifically referred to and other features of my invention are incorporated in the structure disclosed on the drawing, in which drawing Figure 1 is a plan view of the lock structure with the steering column, to which it is applied, in transverse section;

Figure 2 is a section on plane II—II of Figure 1;

Figure 3 is a view on plane III—III of Figure 2;

Figure 4 is a plan view of the locking bolt; and

Figure 5 is a section similar to Figure 2 showing a modified arrangement.

The lock structure shown comprises the body or housing 10 having at one side the vertical cylindrical passageway 11 therethrough for receiving the steering column 12 of an automotive vehicle, through which column extends the steering shaft 13 supporting at its upper end a wheel (not shown) by which the shaft may be turned for steering the vehicle. The body is opened by a split or slot 14 so that it may be contracted into intimate and secure engagement on the steering column as by means of a bolt 15. A collar 16 is rigidly secured to the steering shaft and has a locking notch 17 at one side thereof which registers with the opening 18 through the steering column when the steering shaft is in a certain position, usually in position for straightforward travel of the vehicle.

An arm or bracket 19 which may be integral with the housing 10 extends rearwardly therefrom behind the steering column, this arm being shown broken away but terminating in flanges (not shown) by means of which the arm may be secured to a suitable support as for example the dashboard of the vehicle.

Extending through the housing 10 preferably at right angles to the axis of the steering column is the cylindrical bore 21 for receiving the lock bolt and switch controlling lever structure. The lock bolt structure comprises the cylindrical head 22 with the reduced outer end 22' extending therefrom, the head 22 fitting the bore so as to guide the head therein. The head has the axially extending cylindrical pocket 23 for guiding the lock plunger or bolt 24, a spring 25 seated in the bottom of the pocket abutting against the bolt and tending to shift it outwardly. To limit the movement of the bolt 24 a detent plate 26 extends into the pocket through a slot 27 in the head 22 and projects into the notch 28 formed in the bolt, the engagement of the shoulders at the end of this notch with the detent plate limiting the outward and inward movement of the bolt. When the head 22 is shifted inwardly in the bore 21 the bolt will extend through the hole 18 in the steering column 12 and if the notch 17 in the ring on the steering shaft is in alignment with the hole 18 the bolt will be projected into the notch by the spring, thus to lock the steering shaft to the lock structure body and prevent rotation of the shaft and steering of the vehicle.

For controlling the shifting movement of the lock bolt structure I provide a lock cylinder 29 which is seated and secured in the cylindrical opening 30 extending into the housing 10 at right angles with the axis of the bore 21. The lock cylinder journals a lock barrel 31 which may be turned by means of a suitable key inserted in the keyhole 32, the lock cylinder at its inner end having a cam disc 33 secured thereto eccentric relative to the barrel axis and this cam disc engages in the transverse slot 34 formed in the head 22 of the lock bolt structure so that when the lock barrel is turned the lock bolt structure will be shifted in axial direction in the bore 21. The cam disc fits accurately in the slot 34 and intimately engages the flat base thereof so that the lock bolt structure will be held against rotational movement in the bore 21. In the position shown in Figure 2 the lock barrel has been turned to swing the cam disc to the left with its center in horizontal alignment with the axis of the lock barrel and the lock bolt structure will thus be held in its locking position. Upon rotation of the lock barrel 180° the lock bolt structure will be shifted outwardly to unlocking position and will be held in this position by the cam disc.

Projecting into the outer end of the bore 21 is the hub 35 from whose outer end extends the lever 35', the hub having the cylindrical bore 36 receiving the reduced end 22' of the lock bolt head 22. The hub 35 is rotatable in the bore 21 but is locked against axial displacement as by means of a spring ring 37 engaging in opposed notches in the hub and in the lock housing. As the key is turned in the lock the lock bolt structure will be shifted longitudinally in the bore 21 with its end 22' sliding in the bore 36 of the hub.

Mounted on the back side of the housing 10 is the switch structure which is controlled when the hub 35 is rotated. The switch structure comprises a rectangular sheet metal cup or casing 38 having a cover 39 of insulating material which supports two terminal posts 40 and 41 whose inner ends terminate flush with the inner face of the cover. Within the cup 38 is the switch block 42 having at one end in its under side a pivot recess 43 for receiving the pivot post 44 which may be formed by deflecting upwardly a section of the bottom of the cup 38. At its other end and in the under side thereof the switch block has the longitudinally extending slot 45 into which projects a pin 46 which is secured to and extends radially from the hub 35, the housing 10 having the clearance slot 47 through which the pin extends. In the bottom of the cup 38 is the clearance hole 48 through which the pin extends and as the hub 35 is rotated the pin will swing the switch block on its pivot post 44. On its top the switch block supports a switch blade 49 which extends longitudinally thereof and is anchored at its center as by means of a rivet 50. The ends of the blade are beaded and one end is always in electrical contact with terminal post 40 which is in alignment with the pivot post 44, but the other terminal post 41 is offset laterally a distance so that when the switch block is parallel with the axis of the hub 35 the other end of the switch blade will be at one side of and out of engagement with the terminal post 41, but when the switch block is rotated both terminal posts will be engaged by the switch blade and the circuit connected with the terminal posts will be closed, such circuit in this case being the ignition circuit for the engine of the vehicle.

The hub 35 and the lock bolt structure are interlocked so as to compel a certain sequential operation thereof. In the reduced end 22' of the lock bolt structure a slot section 51 extends a distance inwardly from the end thereof and parallel with the axis of the lock bolt structure and at its inner end this longitudinal slot communicates with a slot 52 which extends a distance in circumferential direction. The switch actuating pin 46 cooperates with the slot for the interlocking operation and when the lock bolt structure is in its outer or locking position the longitudinal slot 51 receives the pin end and locks the hub 35 to the lock bolt structure against relative rotational movement, and as the lock bolt structure is held against rotational movement the hub 35 will be locked against rotational movement at this time. The hub cannot therefore be turned by its lever 35' to operate the switch block which at this time is positioned with its switch blade disconnected from the terminal post 41 so that the switch is open. However when the lock bolt structure is shifted inwardly by manipulation of the key in the lock and into unlocking position, the transverse slot 52 comes into alignment with the end of the pin 46 and then the lever 35' may be swung upwardly to rotate the hub 35 in corresponding direction, the inner end of the pin 46 then moving in the slot 52 and the switch block will be swung to carry its blade into engagement with the terminal post 41 and the circuit will be closed. Thus with the arrangement shown, the switch can be closed only when the locking bolt structure is in its outer or unlocking position. Also, when the lock bolt structure is in its unlocking position and the lever has been swung to close the switch, the engagement of the end of the pin in the transverse slot 52 will prevent outward shift of the lock bolt structure to locking position and before such movement of the lock bolt structure can be accomplished the switch lever structure must be swung back to bring the pin 46 into alignment with the horizontal slot 51 in the lock bolt structure, such swing back movement causing reopening of the switch. Locking conditions can therefore not be reestablished until the circuit has been opened. The interlocking connection between the switch control lever structure and the lock bolt structure thus compels a sequential operation, namely, unlocking of the bolt structure before the lever structure can be actuated to operate the switch, and movement of the lever structure to switch opening position before the lock bolt structure can be shifted to locking position. After the lock bolt structure has been shifted to unlocking position the lever is free for movement back and forth to either open or close the switch and the controlled circuit.

On the housing 10 an escutcheon plate 54 may be applied with the indications "On" and "Off" thereon, the lever 35' then acting as a pointer for cooperating with these indications to indicate whether the circuit is on or off. The lock structure 29 may be of the type which will prevent withdrawal of the key except when the lock bolt structure is in locking position and the driver of the vehicle will thus know whether the lock is open or closed.

In Figure 5 I have shown a modified arrangement. The bolt structure head 55 has the reduced outer end 55' and is guided in the bore 56 in the housing and contains the lock bolt 57 whose movement is limited by the plate 58 extending into the notch 59 in the lock bolt. The lock barrel 60 in the lock cylinder 61 has the cam disc 62 engaging in the slot 63 in the head 55 and by the turning of the key in the lock barrel the bolt structure is shifted longitudinally in the bore 56. A pin 64 extending from the head 55 engages in the longitudinally extending slot 65 cut in the housing 10 and this engagement prevents turning movement of the head 55 in the bore 56.

At its outer end the housing 10 has the enlarged cylindrical bore section 66 for receiving the hub 67 from which extends the lever 67'. The inner end of the hub is of full diameter to engage accurately in the bore section 66 and a guide bushing 68 is secured in the outer end of the bore section to receive the reduced end of the hub. At its inner end the hub abuts against the shoulder 69 at the base of the bore section 66 and a spring 70 is inserted between the inner section of the hub and the bushing 68 and tends to hold the hub in its inner position and to prevent rattling thereof.

The hub has the bore 71 receiving the reduced end 55' of the lock bolt structure head 55 so that the bolt structure may shift longitudinally in the bore 56 and in the bore of the hub 67. The hub has a pin 72 secured to and extending radially therefrom and through the clearance slot 73 formed in the housing 10, the outer end of the pin engaging with a switch block arranged in the switch housing 74 in the same manner as in the arrangement disclosed in Figures 1 to 3.

In the reduced end 55' of the lock bolt structure head 55 is the longitudinally extending slot 75 which at its inner end communicates with the transversely extending slot 76 and a pin 77 secured to and extending from the hub 67 cooperates with the slot for interlocking association of the lock bolt structure and the hub structure 67. When the lock bolt structure is in its outer or locking position as shown in Figure 5 the longitudinal slot 75 receives the pin 77, and, as the lock bolt structure is at all times locked against rotational movement, the hub 67 will now be locked against rotation and the switch will be held in open position. However when the lock bolt structure is shifted inwardly by manipulation of the key, the transverse slot 76 comes into registration with the pin 77, and then the lever 67' can be swung to rotate the hub 67, the pin 77 traveling through the slot 76 and the pin 72 then actuating the switch structure for opening of the circuit. While the hub structure is in this position with the switch open the engagement of the pin 77 in the slot 76 will prevent shifting of the lock bolt structure back to locking position and the lever 67' must first be swung to carry the pin 77 back into registration with the longitudinal slot 75 and to open the switch before the lock bolt structure can be shifted outwardly into locking position. The interlocking association thus defines the sequential operation of the bolt structure and switch operating mechanism.

In the structures shown the parts are of simple design and can be economically manufactured and assembly is also very easily accomplished. In the arrangement of Figure 2 the lock bolt structure is first inserted into the bore 21 from the outer end thereof and the lock cylinder 29 is then installed, and then the hub 35 is inserted and the spring ring 37 clamped into locking position. The switch structure is then secured as by means of screws 78 extending therethrough and threading into the housing 10, and the device is ready for operation. In the arrangement of Figure 5 substantially the same assembly procedure is followed.

I have shown an efficient and practical embodiment of the various features of my invention but I do not desire to be limited to the exact construction, arrangement, and operation shown and described as changes and modifications may be made without departing from the scope of the invention as defined by the appended claims.

I claim as follows:

1. In combination, an axially movable locking bolt element and means for effecting such movement, means preventing rotational movement of said bolt element, a switch, a rotatable control element for said switch coaxial with said locking bolt element, and means whereby said switch control element is operable only when said bolt element is in unlocking position.

2. In combination, a locking bolt element, means for axially moving said element to locking or unlocking position, means preventing rotational movement of said bolt element, a switch, a rotatable control element for said switch coaxial with said locking bolt element, and interlocking connection between said elements effective to lock said switch control element against operation when said bolt element is in locking position and to prevent movement of said bolt element to locking position when said switch is held in one circuit controlling position by said control element.

3. In combination, a lock housing, a lock bolt element shiftable axially in said housing to locking or unlocking position but being restrained against rotational movement, a switch on said housing, a control element for said switch having rotatable support in said housing coaxial with said bolt element but being restrained against axial movement, means controlled by said bolt element for locking said switch control element when said bolt element is in locking position and to release said switch control element when said bolt element is in unlocking position, and means controlled by the rotation of said switch control element after release thereof for preventing movement of said bolt element to locking position.

4. In combination, a housing, a first control member, a second control member, a lock bolt element confined to axial movement in said housing and means for effecting said movement, an actuating element for said second control member confined in said housing to rotational movement and having telescopic association with said bolt element, and interlocking connection between said elements effective to release said actuating element for movement only when said bolt element is in unlocking position and to lock said bolt element against movement to locking position when said released actuating element has been moved to operate said second control member.

5. In combination, a member to be locked, a circuit controlling switch, a lock bolt element adapted for axial movement but restrained against rotational movement, a rotatable actuating element coaxial with said bolt element and connected with said switch, an extension on one of said elements, a slot in the other element having a longitudinal section and a transverse section, said longitudinal slot section and projection being in engagement when said bolt element is in locking position whereby to prevent movement of said actuating element, said transverse slot section and projection being in engagement when said bolt element is in unlocking position whereby said actuating element will be released for movement to operate said switch, engagement of said projection and transverse slot section after switch operating movement of said actuating element preventing return movement of said lock element to locking position.

6. In combination, a member to be locked, a circuit controlling switch, a lock element adapted for axial reciprocation to locking or unlocking position relative to said member to be locked, an actuating element adapted when rotated to operate said switch, means holding said lock element against rotational movement, means locking said actuating element to said lock element to prevent rotation thereof when said lock element is in locking position, and means for unlocking said actuating element for switch operating movement when said lock element is in unlocking position and for preventing return of said lock element to locking position after the released actuating element has been rotated to operate said switch.

7. In combination in a lock structure, an axially movable locking bolt element and means for effecting such movement, a switch, and a rotatable control element therefor, said elements being independently movable and their axes extending in the same direction, and interlocking connection between said elements whereby the ability to move one of said elements is dependent upon the position of the other element.

8. In combination in a lock structure, an axially movable locking bolt element and means for effecting such movement, a switch and a rotatable control element therefor, said elements being independently movable and their axes extending in the same direction, and interlocking connection between said elements whereby the independent movement of either element is dependent upon the relative positions of said elements.

9. In combination, an axially movable but non-rotatable locking bolt element, a switch and a rotatable control element therefor, the axes of said elements extending in the same direction, and interlocking connection for said elements whereby the movement of one element is dependent upon the relative positions of said elements.

10. In combination in a lock structure, a non-rotatable lock bolt element shiftable axially, a switch, a rotatable actuating element for said switch, the axes of said elements extending in the same direction, and interlocking connections for said elements controlled by the relative movements thereof whereby the movement of one element is dependent upon the relative position of the other element.

11. A lock in which is comprised a locking bolt member, an electrical switch, means for shifting said bolt member to locking or unlocking position without actuating said switch, an actuating member for said switch rotatable independently of movement of said bolt member on an axis extending in the same direction as the shifting movement of said bolt member.

12. A locking bolt member and an actuating member mounted coaxial with said locking bolt member and rotatable independently thereof, and a switch controlled by aid actuating member, and means controlled by the relative movement of said members for interlocking said members.

13. In combination, a switch, a rotatable actuating member therefor, a lock bolt shiftable relative to and in the direction of the axis of said actuating member, and means for shifting said bolt to lock or unlock said actuating member.

14. In combination, a switch, a rotatable actuating member for said switch, a locking bolt coaxial with said actuating member and shiftable relative thereto, and means controlled by the shifting of said bolt for locking or unlocking said actuating member.

15. In combination, a first control, a second control, a rotatable actuating member for said first control, and a key operated locking bolt member for alternately locking said second control and releasing said actuating member.

16. In combination, a first control, a second control, a rotatable actuating member for said first control, and a key operated locking bolt member for alternately locking said second control and releasing said actuating member, said members being coaxial.

17. In combination, a first control, a second control, a rotatable actuating member for said first control, and a key operated locking bolt member for alternately locking said second control and releasing said actuating member, said members engaging telescopically.

18. A lock in which is combined a locking bolt, an electrical switch, means for shifting said bolt into locking or unlocking position, a lever having a hub in which said bolt is slidable during shifting movement thereof, means holding said lever against movement with said bolt during shifting thereof, and a connection whereby swing of said lever will cause operation of said switch.

19. In combination, a rotatable actuating member and an electrical switch controlled thereby, a locking bolt telescopically received by said actuating member and shiftable independently thereof, and means for locking said actuating member when said bolt is shifted in one direction.

20. In combination in a lock structure, a housing having a bore therethrough, a lock bolt element shiftable axially in said bore, a rotatable actuating element extending into said housing and surrounding said bolt element, a switch connected with said actuating element, and interlocking connection between said elements whereby the independent movement of either element is dependent upon the relative positions of said elements.

21. In combination in a lock structure, a housing having a bore therethrough, a lock bolt element shiftable axially in said bore but restrained from rotational movement, a rotatable actuating element extending transversely into said housing and concentric with said bolt element, a switch on said housing connected with said actuating element, and means for interlocking said elements whereby to prevent operation of said actuating element except when said lock element is in unlocking position.

22. In lock structure for the steering and ignition of an automotive vehicle, the combination of a housing having a longitudinal bore and a transverse bore, a lock bolt element shiftable in said longitudinal bore to locking and unlocking position, means holding said bolt element against rotational movement, an ignition controlling switch on said housing, an actuating element for said switch in said transverse bore fulcrumed on said bolt element for rotational movement to operate said switch, means holding said actuating element against axial movement, and an interlocking connection between said elements operable to release said actuating element for switch operation only when said bolt element is in unlocking position and to prevent return of said bolt element to locking position when said actuating element is in position to open said switch.

23. In combination in a lock structure, a housing, a lock bolt member shiftable axially in said housing to locking or unlocking position, a switch, an actuating member for directly actuating said switch and extending transversely through said housing and rotatable on an axis extending in the same direction as that of the shifting movement of said bolt member, and means for locking said actuating member against switch operation except when said bolt member is in unlocking position.

24. In combination in a lock structure, a housing, a lock bolt member shiftable axially in said housing to locking or unlocking position, a switch, an actuating member for directly actuating said switch and extending transversely through said housing and being concentric with said bolt member, and means for locking said actuating member against switch operation thereby except when said bolt member is in unlocking position.

25. In combination in a lock structure, a housing, a lock bolt member shiftable axially in said housing to locking or unlocking position, a switch, a rotatable actuating member extending transversely through said housing and fulcrumed on said bolt member and having operative connection with said switch independently of said bolt member, and means for locking said actuating member against switch operation except when said bolt member is in unlocking position.

26. In combination, a first control, a second control, a rotatable actuating member for said first control, and a key operated longitudinally shiftable locking bolt for alternately locking said second control and releasing said actuating member, the axis of rotation of said actuating member and the longitudinal axis of said bolt being in a common plane.

In testimony whereof I have hereunto subscribed my name at Chicago, Cook County, Illinois.

ALEXANDER C. MABEE.